United States Patent
Sekine et al.

[11] Patent Number: 6,067,497
[45] Date of Patent: May 23, 2000

[54] VEHICLE CONTROL SYSTEM FOR CONTROLLING VEHICLE BASED ON ROAD SHAPE

[75] Inventors: Hiroshi Sekine; Shohei Matsuda, both of Saitama, Japan

[73] Assignee: Honda Giken Kogyo Kabushiki Kaisha, Tokyo, Japan

[21] Appl. No.: 08/961,476

[22] Filed: Oct. 31, 1997

[30] Foreign Application Priority Data

Nov. 12, 1996 [JP] Japan .................................. 8-300279

[51] Int. Cl.[7] ............................. G08G 1/09; G01C 21/00
[52] U.S. Cl. ............................ 701/93; 701/208; 701/70; 180/179; 340/441
[58] Field of Search ............................ 701/208, 70, 93; 340/425.5, 438, 441; 180/179

[56] References Cited

U.S. PATENT DOCUMENTS

| | | | |
|---|---|---|---|
| 5,315,295 | 5/1994 | Fujii | 340/936 |
| 5,485,381 | 1/1996 | Heintz et al. | 701/93 |
| 5,539,397 | 7/1996 | Asanuma et al. | 340/901 |
| 5,546,311 | 8/1996 | Sekine | 701/208 |
| 5,748,476 | 5/1998 | Sekine et al. | 701/93 |

FOREIGN PATENT DOCUMENTS 6281471 7/1994 Japan .

*Primary Examiner*—Michael J. Zanelli
*Attorney, Agent, or Firm*—Carrier, Blackman & Associates, P.C.; Joseph P. Carrier; William D. Blackman

[57] ABSTRACT

A vehicle control system reduces the arithmetic operations for deciding the passableness of the vehicle through an upcoming curve and also avoids unnecessarily effecting automatic deceleration and warning, which are not completely indispensable in a system for performing the warning or automatic deceleration, so that the vehicle may pass through a curve at a proper vehicle speed and with minimum distraction to the vehicle occupants. Assuming that the driver performs a voluntary deceleration at a predetermined deceleration from the current vehicle speed, the system calculates an estimated passage speed of a tentative position $N_k$, as set on a road ahead of an actual position $P_0$. The system then sets a passable zone $Z_1$, a warning zone $Z_2$ and an automatic deceleration zone $Z_3$ on the basis of turnable radii $R_1$ and $R_2$, at which a predetermined transverse acceleration is established at the estimated passage speed, as well as an arc $C_1'$ defining a range of a predetermined distance from the tentative position $N_k$. The driver is warned by the system, when any of nodes $N_{k+1}$, - - - , and soon ahead of the tentative position $N_k$ is present in the warning zone $Z_2$, and the vehicle is automatically decelerated by the system when any of the nodes is present in the automatic deceleration zone $Z_3$.

13 Claims, 13 Drawing Sheets

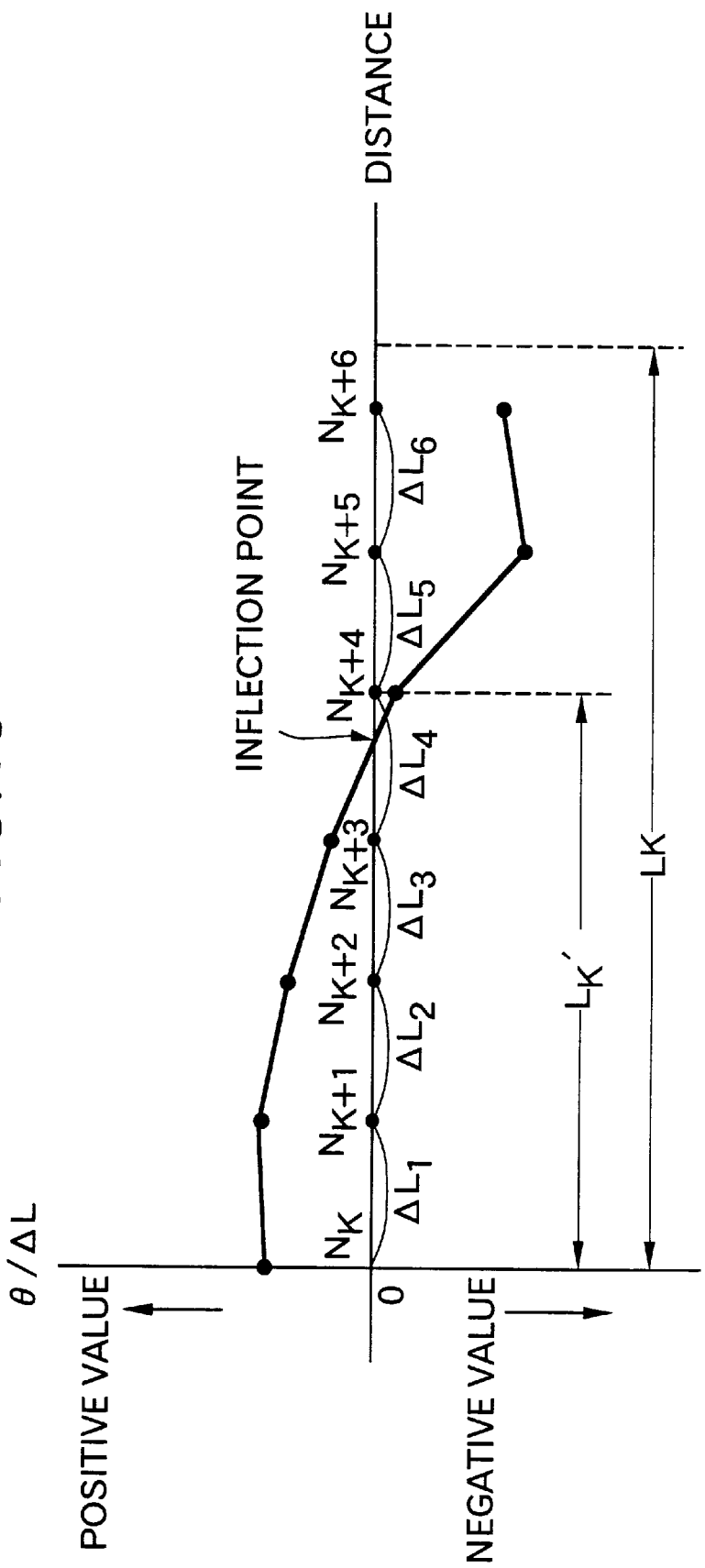

VEHICLE CONTROL SYSTEM FOR CONTROLLING VEHICLE BASED ON ROAD SHAPE

BACKGROUND OF THE INVENTION

1. Technical Field to Which the Invention Belongs

The present invention relates to a vehicle control system for controlling a vehicle on the basis of a road shape, as decided on the basis of map data comprised of a set of coordinate points obtained from a navigation system.

2. Discussion of Relevant Art

According to a previously proposed system (i.e., Japanese Patent Application Laid-Open No. 6-281471) of the same Assignee, a passable zone is set on a map on the basis of map data obtained from a navigation system, so that when a curve ahead of the subject vehicle of the driver goes out of the passable zone, a warning is issued to urge the driver to decelerate the vehicle, or an automatic braking or the like is actuated to effect an automatic deceleration.

In the aforementioned previously proposed system, however, it is decided whether or not the vehicle can pass through a curve far ahead of its actual position. As a result, arithmetic operations, not necessarily indispensable, are performed to increase loads on the arithmetic units. This raises a problem that the arithmetic units must have large capacities. When the road ahead is bent in S-shape, moreover, this S-shaped road may partially belong to an automatic deceleration zone or a warning zone, even if the curve is actually passable because a sufficient deceleration distance is present from the actual position to the curve. Then, the not-necessarily-indispensable automatic deceleration or warning may be executed to bother the driver.

SUMMARY OF THE INVENTION

The present invention has been conceived in view of the limitations and disadvantages of the background described above and has an object to reduce the arithmetic operations for deciding the passableness and to avoid unnecessarily actuating the automatic deceleration and warning in situations where these actions are actually not required.

According to a first aspect and feature of the invention, a vehicle control system is provided in which a tentative position is set on a road ahead of an actual position of a subject vehicle by tentative position setting means; an estimated passage speed in the tentative position is calculated by estimated passage speed calculating means on the basis of the distance between the actual position and the tentative position; a turnable radius in the tentative position is calculated by turnable radius calculating means on the basis of an estimated passage speed; and a plurality of passableness deciding zones are set by zone setting means with arcs in contact with the tentative position on the turnable radii within a range of a predetermined distance ahead of the tentative position. The passableness of the vehicle is decided by overlapping the road data of the road ahead of the tentative position, as obtained from a map data outputting means and the passableness deciding zones decided by passableness deciding means, so that when it is decided that the vehicle cannot safely pass, the vehicle is automatically controlled and enabled by control means to pass the road ahead, which may include a curve.

According to a second aspect and feature of the invention, the predetermined distance for setting the passableness deciding zones is set on the basis of an estimated passage speed at the tentative position. As a result, the passableness deciding zones can be properly set.

According to a third aspect and feature of the invention, when it is decided by S-curve deciding means that an S-curve is present on the road within a predetermined distance from the tentative position, the predetermined distance is shortened and set as the distance from the tentative position to an inflection point of the S-curve. As a result, a passable S-curve can be prevented from being improperly decided as not passable.

According to a fourth aspect and feature of the invention, the passableness deciding zones include a passable zone, a warning zone and an automatic deceleration zone. When the road data of the road ahead are included in the warning zone, the driver is warned and urged by the control means to decelerate the vehicle. When the road data of the road ahead are included in the automatic deceleration zone, an automatic deceleration is executed by the control means to enable the curve to be safely passed.

According to a fifth aspect and feature of the invention, the passableness deciding zones are set based on a plurality of turnable radii and a plurality of predetermined distances so that they can be properly set.

BRIEF DESCRIPTION OF THE DRAWINGS

FIG. 13 is a graph for determining the inflection point of the road according to the third embodiment.

DETAILED DESCRIPTION OF THE PREFERRED EMBODIMENTS

The present invention will be described in detail in connection with the presently preferred embodiments with reference to the accompanying drawings.

Figure 1:
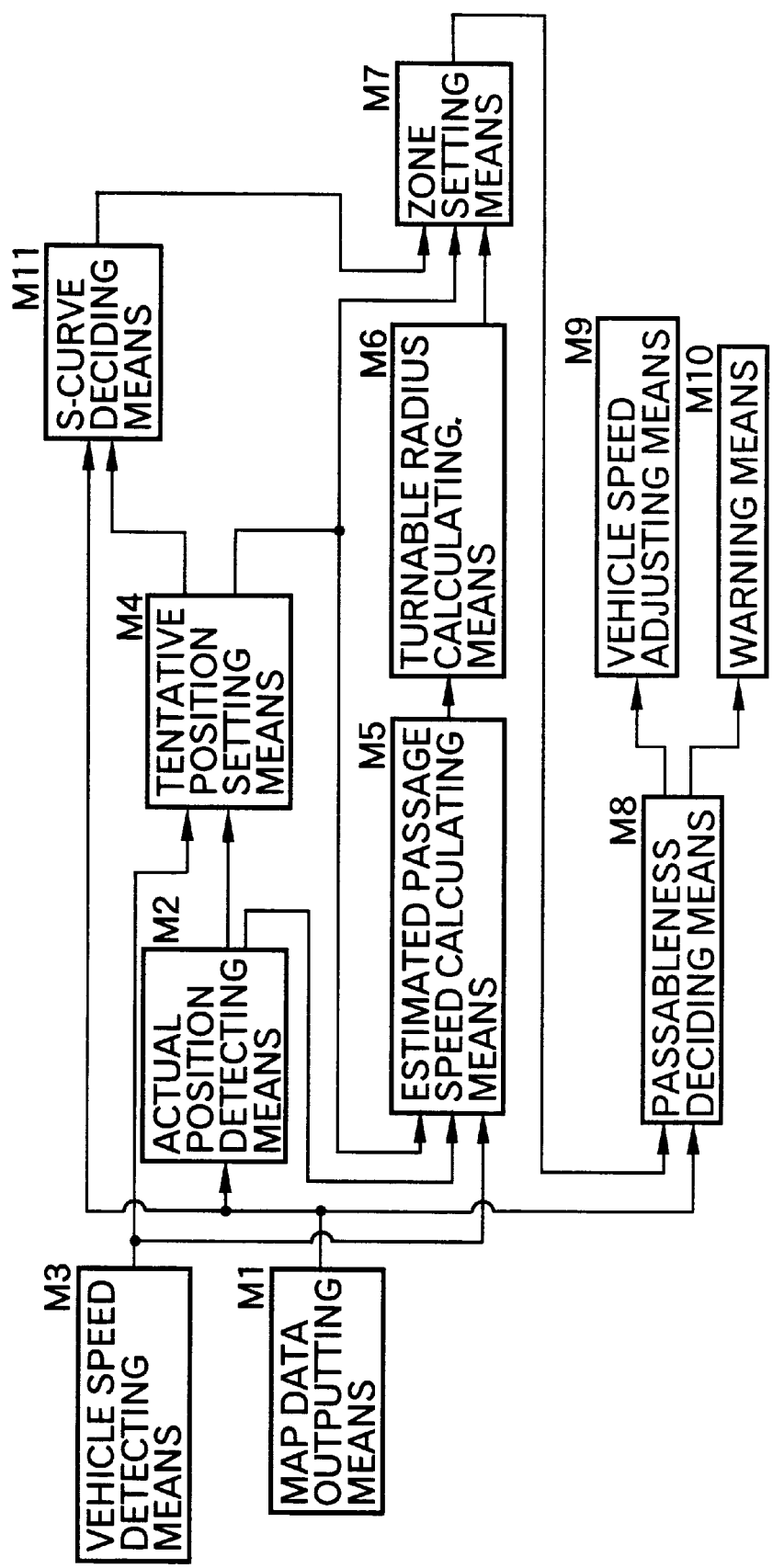
FIG. 1 is a block diagram showing the entire construction of a system according to a first preferred embodiment of the present invention.

As shown in FIG. 1, a vehicle control system of the present embodiment comprises map data outputting means M1, actual position detecting means M2, actual vehicle speed detecting means M3, tentative position setting means M4, estimated passage speed calculating means M5, turnable radius calculating means M6, zone setting means M7, passableness deciding means M8, vehicle speed adjusting means M9, and warning means M10.

The map data outputting means M1 and the actual position detecting means M2 are mounted on a well-known navigation system for a vehicle. The map data outputting means M1 reads out and outputs the road data covering a predetermined range, as stored in advance in an IC card or CD-ROM. The actual position detecting means M2 detects the actual position $P_0$ on the map by overlapping the road data and actual position data, such as received from a GPS antenna. The vehicle speed detecting means M3 detects the current vehicle speed $V_0$ of the vehicle on the basis of the outputs of wheel speed sensors mounted on the individual wheels.

The tentative position setting means M4 sets such a plurality of tentative positions ahead of the actual position $P_0$ as are used for deciding passableness of the road. The estimated passage speed calculating means M5 calculates an estimated passage speed as a vehicle speed at the individual tentative positions when the speed is decelerated at a predetermined rate from the actual position $P_0$. The turnable radius calculating means M6 calculates turnable radii for allowing the vehicle to turn with a predetermined transverse acceleration or less when the vehicle turns at the individual tentative positions at the estimated passage speeds.

The zone setting means M7 sets a passable zone $Z_1$, a warning zone $Z_2$ and an automatic deceleration zone $Z_3$, as will be described, for the individual tentative positions. The passableness deciding means M8 decides whether or not the road ahead can be safely passed through, by overlapping the individual zones $Z_1$, $Z_2$ and $Z_3$ at the individual tentative positions and the road ahead. The vehicle speed adjusting means M9 includes engine output reducing means or braking means for decelerating the vehicle automatically when the road ahead of the tentative position belongs to the automatic deceleration zone $Z_3$. The warning means M10 includes a buzzer, chime or lamp for issuing a warning to the driver when the road ahead of the tentative position belongs to the warning zone $Z_2$.

Figure 2:
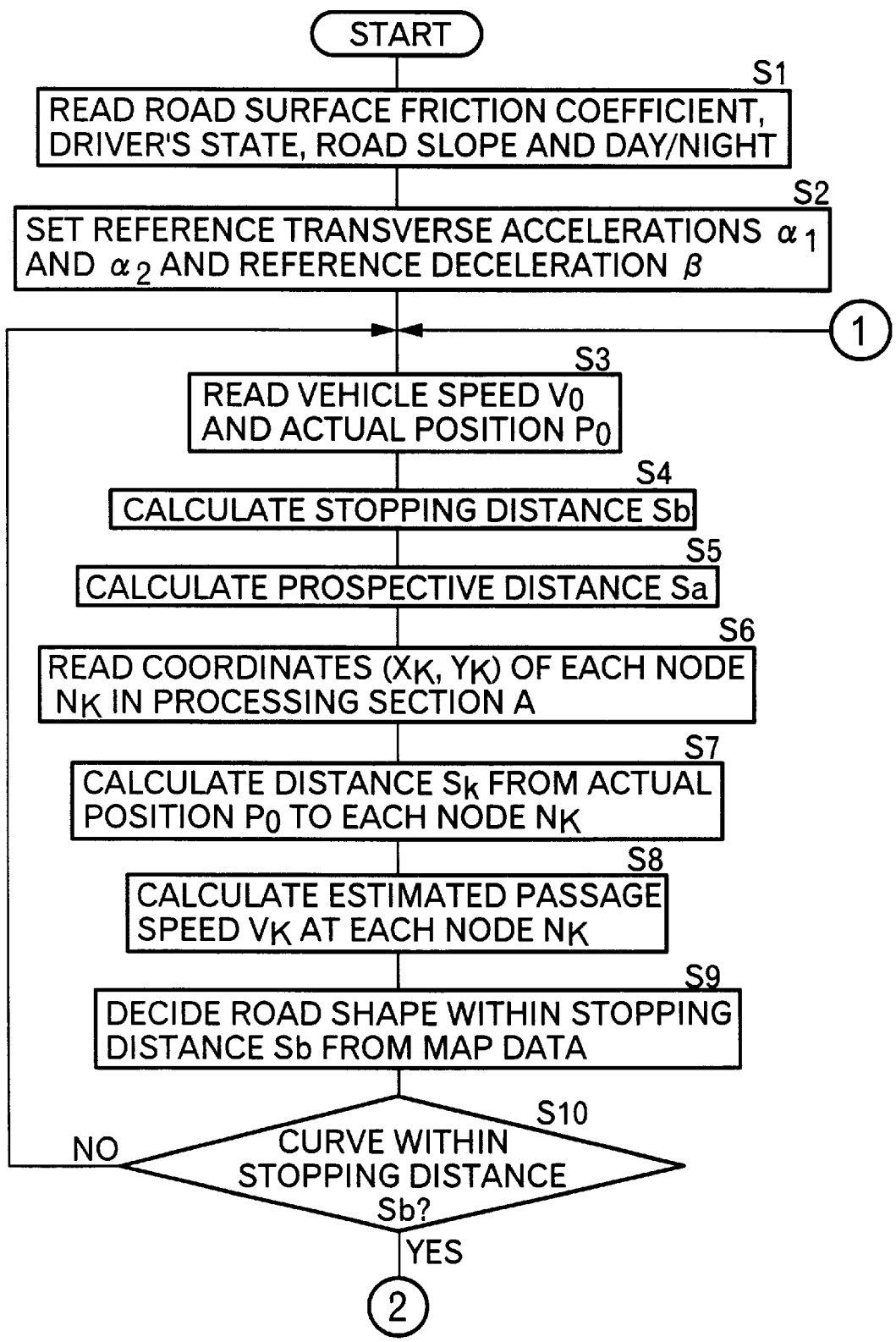
FIG. 2 is a first portion of a flow chart showing operation of the system of FIG. 1.
Figure 3:
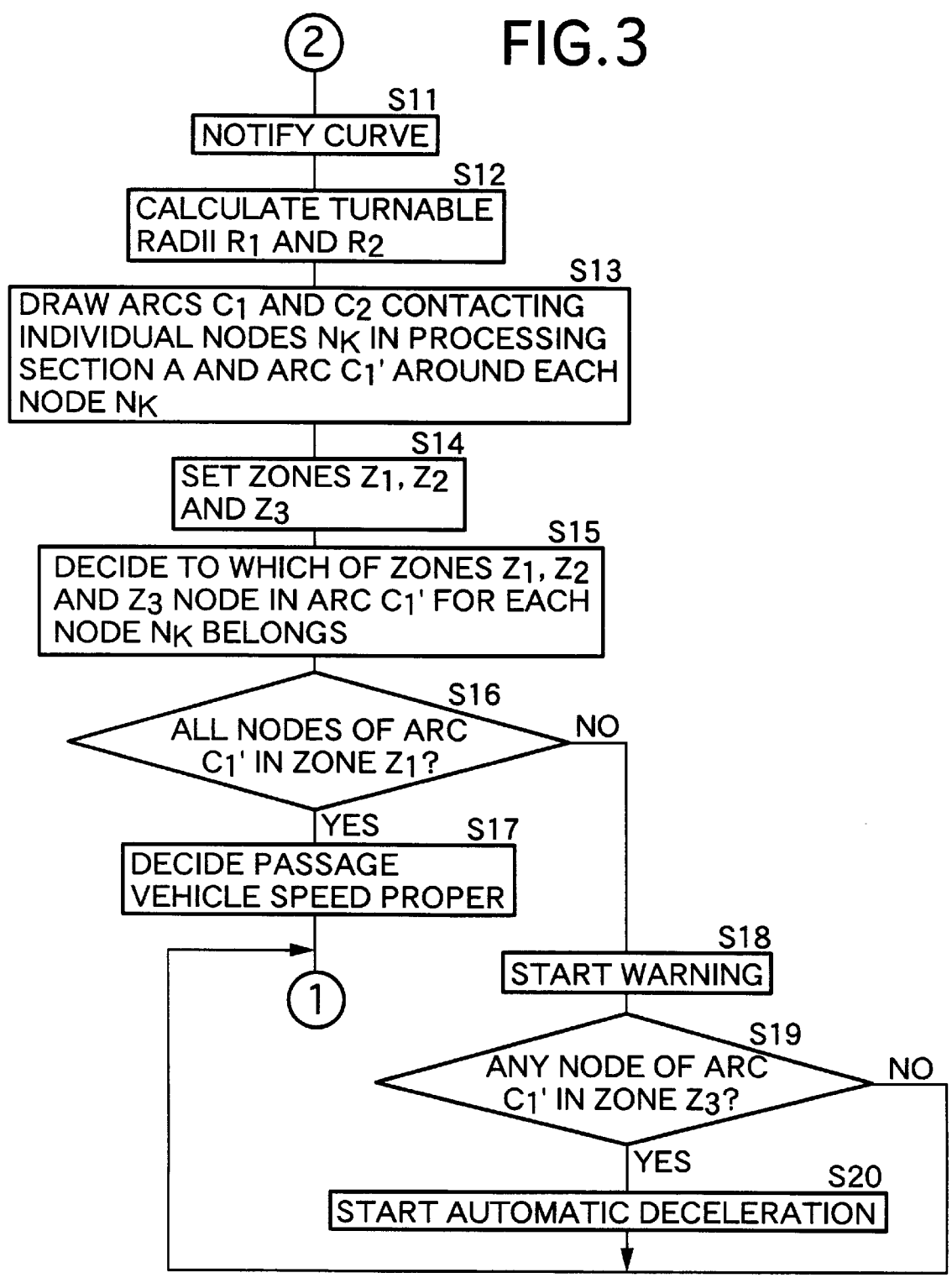
FIG. 3 is a second portion of the flow chart showing operation of the system of FIG. 1.

The operations of the embodiment thus constructed according to the present embodiment will be described with additional reference to the flow charts of FIGS. 2 and 3.

First of all, at step S1, individual elements influencing the control, such as a friction coefficient of a road surface, a state (e.g., driving skill or fatigue) of the driver, a slope of the road, and a light condition corresponding to day or night time are read. Subsequently, predetermined reference transverse accelerations $\alpha_1$ and $\alpha_2$ and a reference deceleration $\beta$ are set at step S2 on the basis of those individual factors.

Here, the first reference transverse acceleration $\alpha_1$ is one for issuing the warning when it may be possibly exceeded by a vehicle when passing a curve, and the second reference transverse acceleration $\alpha_2$ is one for effecting the automatic deceleration when it may be possibly exceeded by a vehicle when passing a curve. For example, the reference transverse accelerations are set such that $\alpha_1=2$ to 3 m/s$^2$ and $\alpha_2=4$ to 6 m/s$^2$ ($\alpha_2>\alpha_1$). On the other hand, the reference deceleration $\beta$ is one at which the vehicle is assumed to perform a deceleration from its present position by the voluntary braking of the driver.

These values $\alpha_1$, $\alpha_2$ and $\beta$ are altered on the basis of the road surface friction coefficient, the driver's state, the road slope or the day or night time condition read at step S1. Under bad conditions such as a small road surface friction coefficient, a bad driver's state, a downslope and a nighttime condition giving a poor visibility, the values $\alpha_1$, $\alpha_2$ and $\beta$ are made smaller (to an allowable side) for an early warning or automatic deceleration.

Next, the vehicle speed $V_0$ is read in from the vehicle speed detecting means M3, and the coordinates $P_0$ ($X_0$, $Y_0$) of the actual position $P_0$ are read in from the actual position detecting means M2 at step S3. Subsequently, a stopping distance Sb is calculated at step S4. This stopping distance Sb corresponds to the distance which is required for the vehicle to stop when the vehicle is decelerated at the reference deceleration $\beta$ from the current vehicle speed $V_0$. In other words, the stopping distance Sb is calculated, as follows:

$$Sb=V_0^2/2\beta \qquad (1).$$

Next, a prospective distance Sa is calculated at step S5. This prospective distance Sa corresponds to the distance which is followed by the vehicle for a predetermined prospective time period t when the vehicle is decelerated at the reference deceleration $\beta$ for the predetermined prospective time period t from the current vehicle speed $V_0$. In other words, the prospective distance Sa is calculated, as follows:

$$Sa=V_0 t-(\beta t^2/2) \qquad (2).$$

Next, by the tentative position setting means M4, a processing section A, as defined by the prospective distance Sa and the stopping distance Sb, is calculated on the road ahead of the subject vehicle, and a plurality of coordinates $N_k$ ($X_k$, $Y_k$) of a plurality of nodes $N_k$ (k=1, 2, 3, - - - , and n), as set on the road of the processing section A, are calculated from the road data of the map data outputting means M1 (at step S6). These nodes $N_k$ constitute the prospective position of the embodiment of the present invention.

Next, the distances $S_k$ between the actual position $P_0$ ($X_0$, $Y_0$) and the individual nodes $N_k$ ($X_k$, $Y_k$) are individually calculated at step S7 by the estimated passage speed calculating means M5. When a deceleration is performed at the reference deceleration $\beta$ from the current vehicle speed $V_0$ at the actual position $P_0$ ($X_0$, $Y_0$) until reaching the individual nodes $N_k$ ($X_k$, $Y_k$), estimated passage speeds $V_k$ (k=1, 2, 3, - - - , and n) at the individual nodes $N_k$ ($X_k$, $Y_k$) are individually calculated at step S8. Since the distances $S_k$ (k=1, 2, 3, - - - , and n) are given, as follows:

$$S_k=(V_0^2-V_k^2)/2\beta \qquad (3),$$

the estimated passage speeds $V_k$ are calculated, as follows:

$$V_k=(V_0^2-2\beta S_k)^{1/2} \qquad (4).$$

Next, the road shape within the stopping distance Sb is decided at step S9 on the basis of the road data coming from the map data outputting means M1. When a curve is present within the stopping distance Sb (at step S10), the driver is notified of the curve by an indication of a lamp or the like at step S11.

Next, by the turnable radius calculating means M6, a node $N_1$, as located at the closest to the driver in the processing section A, is selected as the tentative position $N_1$, and a first turnable radius $R_1$ and a second turnable radius $R_2$ in the tentative position $N_1$ and in turn in all nodes $N_2$ - - - and so on existing in the processing section A ahead of the former are calculated at step S12 on the basis of the estimated passage speed $V_k$ at those nodes $N_k$ and the first and second reference transverse accelerations $\alpha_1$ and $\alpha_2$, as follows:

$$R_1 = V_k^2/\alpha_1 \quad (5);$$

and $$R_2 = V_k^2/\alpha_2 \quad (6).$$

The first turnable radius $R_1$ corresponds to one which can be passed at the first reference transverse acceleration $\alpha_1$ when entering the curve at the estimated passage speed $V_k$, and the second turnable radius $R_2$ corresponds to one which can be passed at the second reference acceleration $\alpha_2$ when entering the curve at the estimated passage speed $V_k$.

Figure 4:
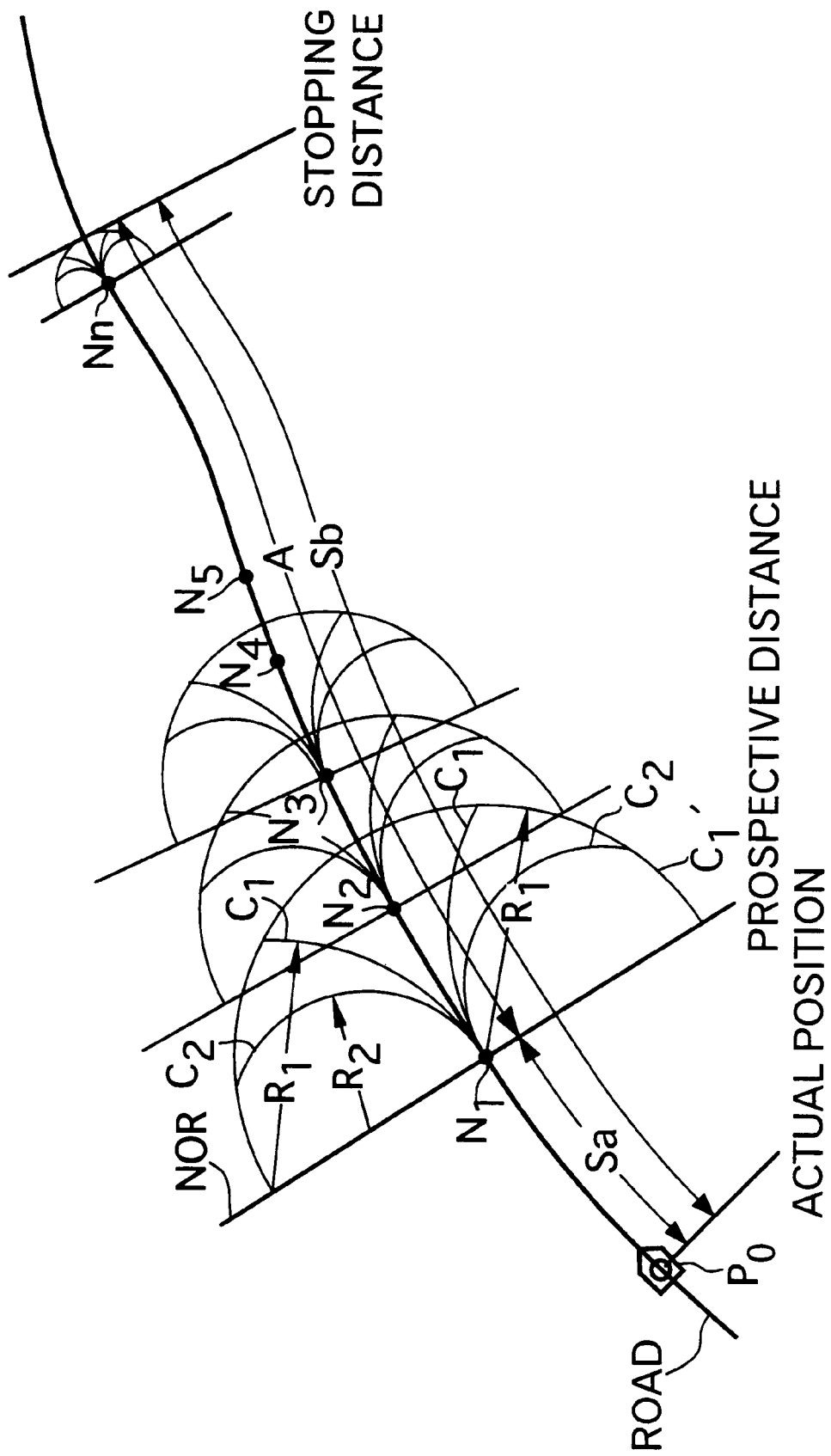
FIG. 4 is a diagram illustrating the state of setting individual zones on a road according to the first embodiment of the invention.

Next, normals NOR of the road are drawn at the individual nodes $N_k$, and a pair of right and left arcs $C_1$ and $C_1$ having the first turnable radius $R_1$, as calculated at step S12, and a pair of right and left arcs $C_2$ and $C_2$ having the second turnable radius $R_2$ are drawn so as to have centers on the normals NOR and contact with each node $N_k$, and then an arc $C_1'$ having the first turnable radius $R_1$ is drawn with the center at each node $N_k$ at step S13. As a result, the five arcs $C_1$ and $C_1$; $C_2$ and $C_2$; and $C_1'$ are drawn to correspond to each node $N_k$, as illustrated in FIG. 4. The radii (i.e., the first turnable radius $R_1$ and the second turnable radius $R_2$) of those five arcs $C_1$ and $C_1$; $C_2$ and $C_2$; and $C_1'$ become smaller in the forward direction from the actual position $P_0$.

Figure 5:
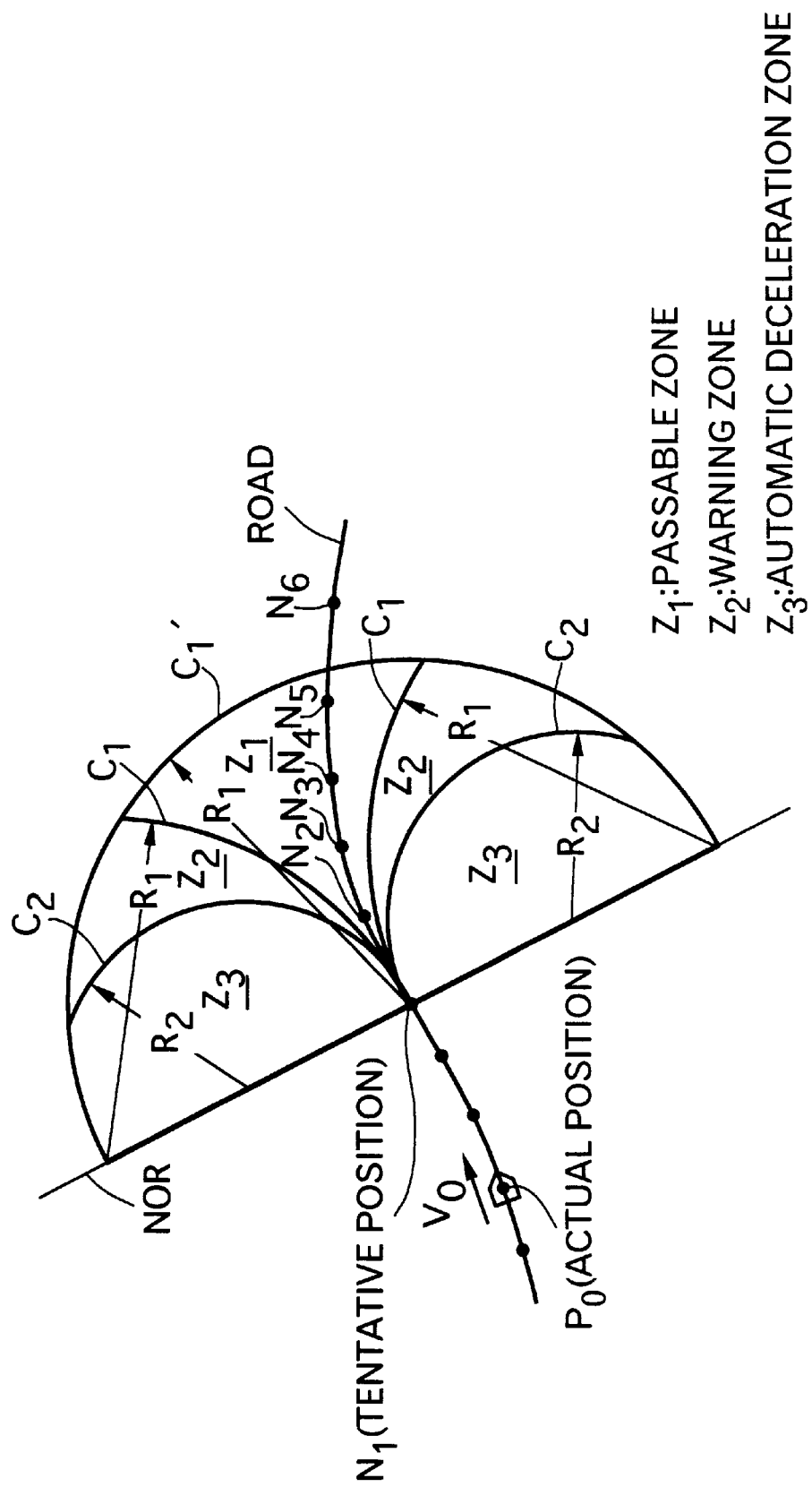
FIG. 5 is a diagram illustrating relations between the individual zones at a tentative position $N_1$ and the road according to the first embodiment of the invention.

Next, the zone setting means M7 sets, at step S14, the passable zone $Z_1$, the warning zone $Z_2$ and the automatic deceleration zone $Z_3$, which are defined by the five arcs $C_1$ and $C_1$; $C_2$ and $C_2$; and $C_1'$ and the normals NOR. FIG. 5 illustrates the aforementioned individual zones $Z_1$, $Z_2$ and $Z_3$ at the node $N_1$, of which: the passable zone $Z_1$ is set ahead of the paired arcs $C_1$ and $C_1$; the warning zone $Z_2$ is set between the paired arcs $C_1$ and $C_1$ and the paired arcs $C_2$ and $C_2$; and the automatic deceleration zone $Z_3$ is set between the paired arcs $C_2$ and $C_2$ and the normal NOR. However, the forward limits of the individual zones $Z_1$, $Z_2$ and $Z_3$ ahead of the node $N_1$ in the forward direction are regulated by the arc $C_1'$ which has the first turnable radius $R_1$ around the node $N_1$.

Next, the passableness deciding means M8 sets the node $N_1$ closest to the driver in the processing section A as the tentative position, and it is decided to which of the zones $Z_1$ to $Z_3$ a predetermined number of nodes $N_2$, $N_3$, $N_4$ and $N_5$ ahead of the tentative position and within the arc $C_1'$ belong. FIG. 5 illustrates the case in which the node $N_1$ is set as the tentative position. This operation is executed, at step S15, for all the tentative positions $N_1$ to $N_n$ by moving the tentative position sequentially from the closest node $N_1$ to the remotest node $N_n$ in the processing section A.

Thus, when the answer of step S16 is YES so that nodes $N_{k+1}$, $N_{k+2}$, - - -, and so on inside of the arcs $C_1'$ around all the tentative positions $N_k$ fall within the passable zone $Z_1$, it is decided, at step S17, that the curve, as decided at step S9, can be passed at a proper vehicle speed, and the routine is returned to step S3.

On the other hand, when the answer of step S16 is NO so that the nodes $N_{k+1}$, $N_{k+2}$, - - -, and so on inside of the arcs $C_1'$ around any tentative position $N_k$ fall within the warning zone $Z_2$ or the automatic deceleration zone $Z_3$, the warning means M10 is actuated to issue a warning to the driver at step S18.

For any tentative position $N_k$, moreover, it is decided, at step S19, whether or not the nodes $N_{k+1}$, $N_{k+2}$, - - -, and so on inside of the arcs $C_1'$ fall within the automatic deceleration zone $Z_3$. When this answer is NO so that the nodes $N_{k+1}$, $N_{k+2}$, - - -, and so on do not fall within the automatic deceleration zone $Z_3$, the routine is returned to step S3. When the answer of step S19 is YES so that any of the nodes $N_{k+1}$, $N_{k+2}$, - - -, and so on fall within the automatic deceleration zone $Z_3$, the vehicle speed adjusting means M9 is actuated to effect the automatic deceleration at step S20.

These operations will be further described with reference to FIG. 6.

The second turnable radius $R_2$, as calculated by Formula (6), takes the maximum at the entrance of the processing section A and 0 at the exit of the processing section A where the vehicle V stops. Therefore, the automatic deceleration zone $Z_3$ takes a converging triangular shape. The first turnable radius $R_1$, as calculated by Formula (5), also takes the maximum at the entrance of the processing section A and 0 at the exit of the processing section A where the vehicle V stops. At the same time, because $R_1 > R_2$, the warning zone $Z_2$ takes a pair of converging triangular shapes extending along the two sides of the automatic deceleration zone $Z_3$. Outside of the warning zone $Z_2$ and the automatic deceleration zone $Z_3$, there is left the passable zone $Z_1$. Here, the forward limits of the individual nodes $Z_1$, $Z_2$ and $Z_3$ ahead of the node $N_1$ are regulated by the arc $C_1'$ having a first turnable radius $R_1$ around the node $N_1$ so that the actual zones $Z_1$, $Z_2$ and $Z_3$ are regulated in the vicinity of the node $N_5$ to take regions, as illustrated in FIG. 6.

Figure 6:
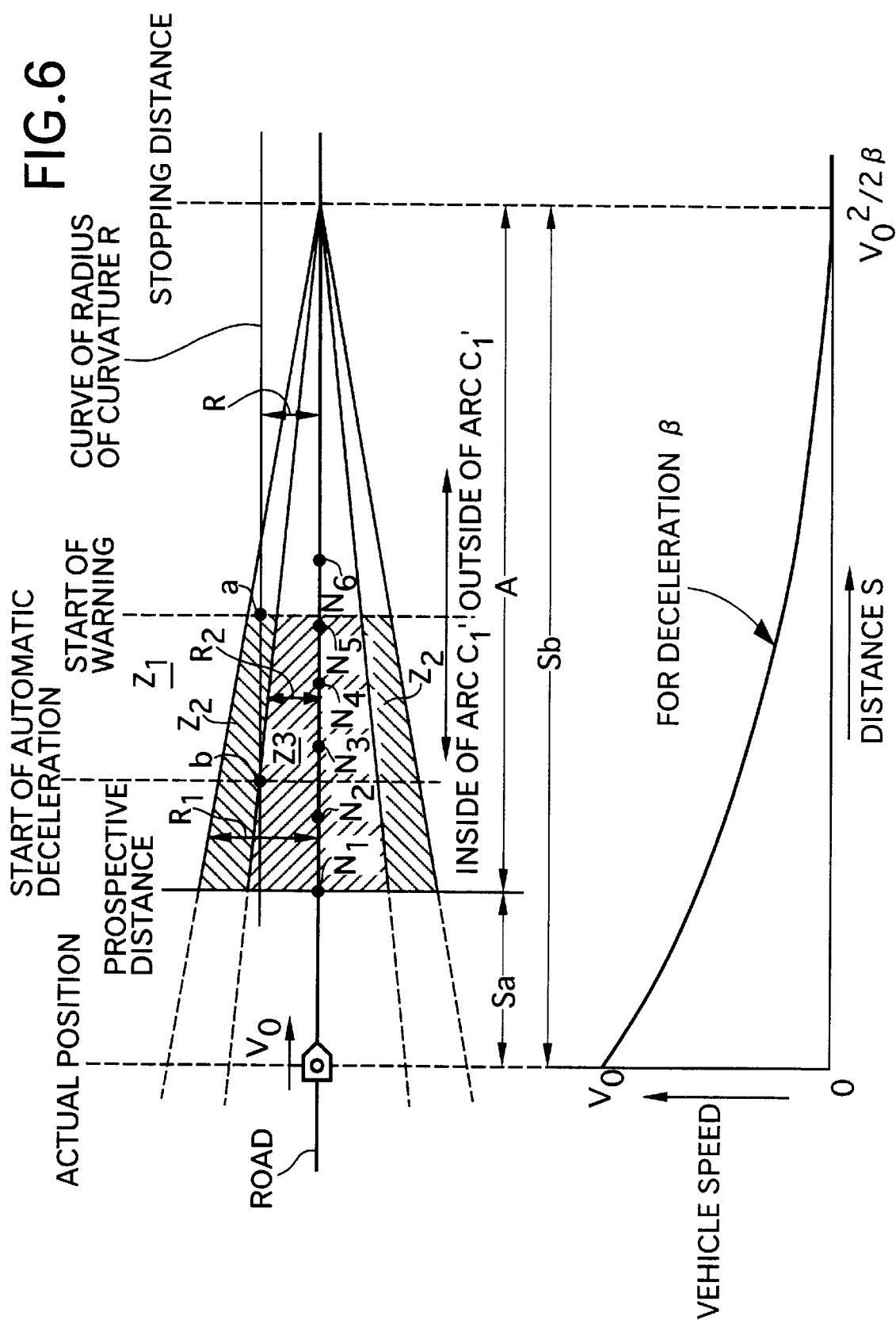
FIG. 6 is a diagram for explaining the operations of the system of FIG. 1.

If it is assumed in FIG. 6 that a curve having a radius of curvature R exists on the road in the processing section A, a point a, at which the straight line indicating the curve having the curvature radius R intersects the outer edge of the warning zone $Z_2$, provides a warning starting position so that the warning is issued when the curve approaches the warning starting position. On the other hand, a point b, at which the aforementioned straight line intersects the outer edge of the automatic deceleration zone $Z_3$, provides an automatic deceleration starting position so that the automatic deceleration is started when the curves approaches the automatic deceleration starting position. Thus, when the curvature radius R of the curve is larger than the maximum first turnable radius $R_1$ at the entrance of the processing section A, the straight line indicating the curve having the curvature radius R will intersect neither the warning zone $Z_2$ nor the automatic deceleration zone $Z_3$ so that neither the warning nor the automatic deceleration is executed.

As described above, the estimated passage speed $V_k$ is calculated by predicting that the driver performs a voluntary braking before the curve based on visual observation or experience and by assuming that the vehicle is decelerated at the preset reference deceleration $\beta$ by the voluntary braking. As a result, the estimated passage speed $V_k$ at each node $N_k$ becomes smaller as the forward distance increases from the actual position $P_0$. Inasmuch as, the aforementioned individual zones $Z_1$, $Z_2$ and $Z_3$, as set on the basis of the estimated passage speed $V_k$, assume the voluntary braking of the driver, the embodiment of the invention desirably avoids effecting the unnecessary and frequent warning by the warning means M10 or automatic deceleration by the vehicle speed adjusting means M9. In other words, the embodiment of the invention minimizes the frequency with which the warning and the automatic deceleration are actuated.

Of the tentative position $N_k$, moreover, the passableness of only a predetermined number of nodes $N_{k+1}$, $N_{k+2}$, - - -, and so on, as present inside of the arc $C_1'$, is decided according to the embodiment of the invention, so that unnecessary excessive decisions of the passableness can be prevented for the nodes far ahead of the actual position $P_0$.

As a result, it is possible to decide the passableness more reliably and to reduce the amount of arithmetic operations used in deciding the passableness, thereby to lighten the loads upon the arithmetic units used in the control system of the invention.

Figure 7:
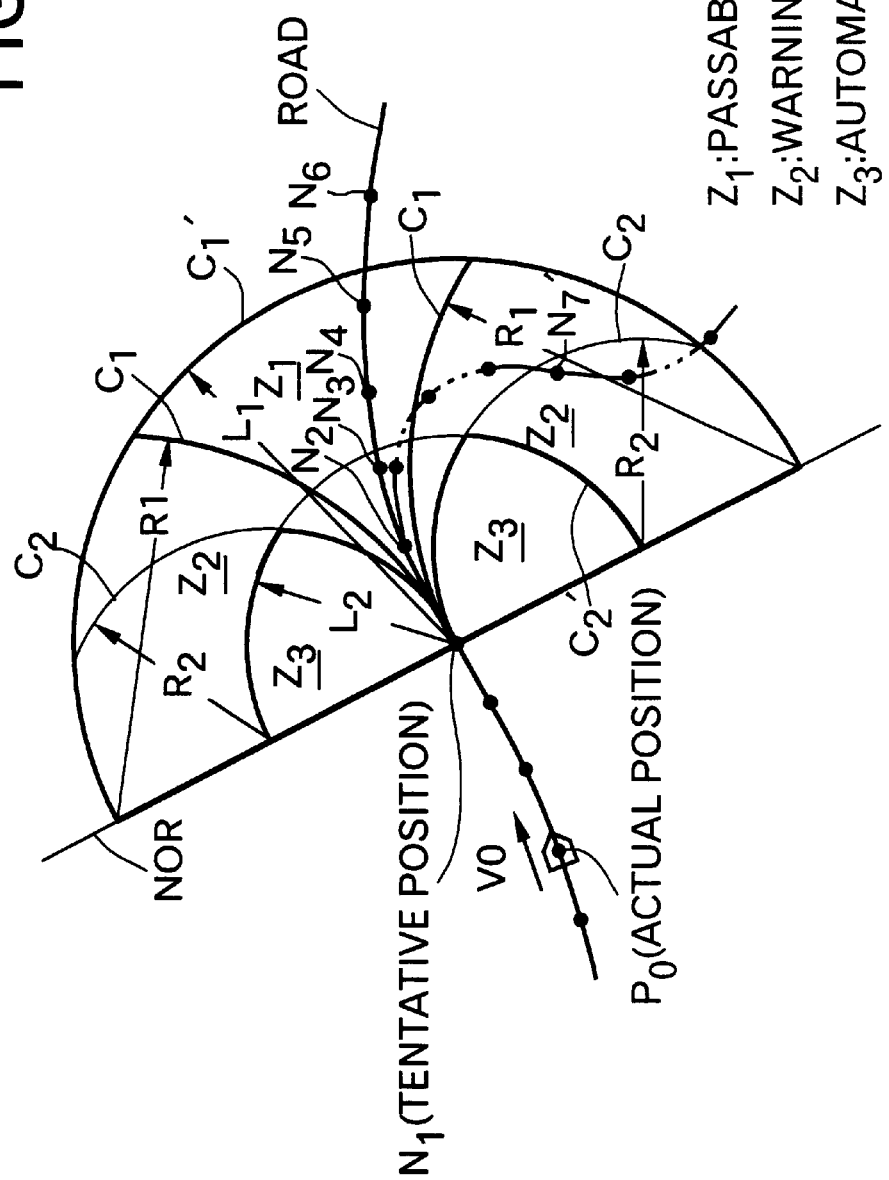
FIG. 7 is a diagram illustrating relations between individual zones at a tentative position $N_1$ and the road according to a second preferred embodiment of the invention.

A second embodiment of the present invention will be described with reference to FIGS. 7 and 8.

This second embodiment is different from the first embodiment in the method of setting the individual zones $Z_1$, $Z_2$ and $Z_3$ by the passableness deciding means M8. As shown in FIG. 7, an arc $C_2'$ having the second turnable radius $R_2$ around each node $N_k$ is drawn in addition to the five arcs $C_1$ and $C_1$; $C_2$ and $C_2$; and $C_1'$ in the first embodiment. Moreover, the warning zone $Z_2$ is defined by the paired arcs $C_1$ and $C_1$, the paired arcs $C_2$ and $C_2$, the arc $C_1'$, the arc $C_2'$ and the normal NOR, and the automatic deceleration zone $Z_3$ is defined by the paired arcs $C_2$ and $C_2$, the arc $C_2'$ and the normal NOR, while leaving the remaining region inside of the arc $C_1'$ as the passable zone $Z_1$.

Figure 8:
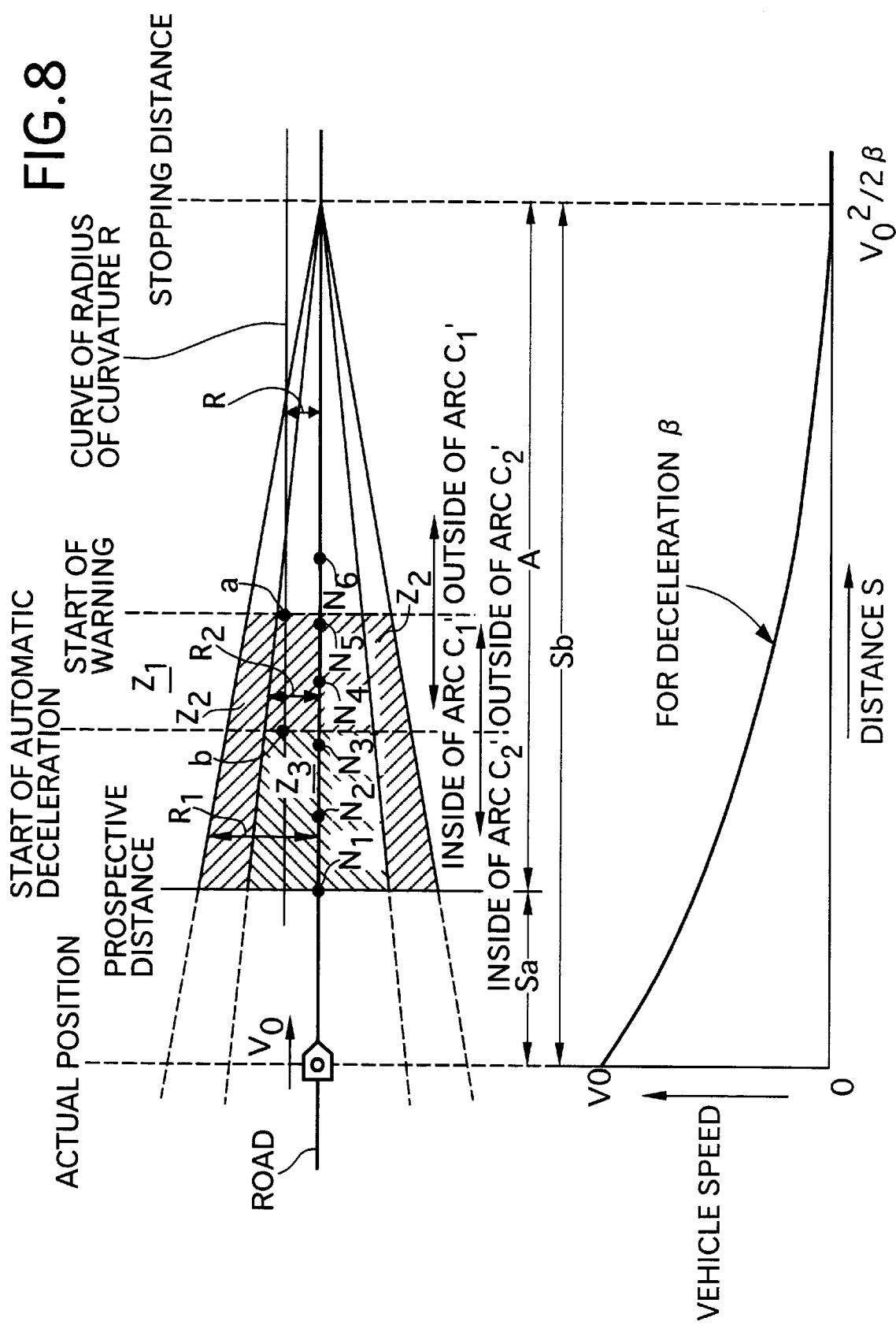
FIG. 8 is an explanatory diagram of operations of the second embodiment.

In the present embodiment, as apparent with additional reference to FIG. 8, the defined range of the automatic deceleration zone $Z_3$ is restricted to the inside of the arc $C_2'$. That is, the automatic deceleration zone $Z_3$ is set at a position close to the actual position $P_0$. As a result, the nodes far ahead of the actual position $P_0$ are excluded from the decision of the passableness on the automatic deceleration zone $Z_3$. This is well demonstrated when considering the case in which a road curving in the shape of letter S is present, as indicated by a chained line in FIG. 7, and in which a node $N_7'$ is contained in the arc $C_2$. As a matter of fact, the node $N_7'$ is located sufficiently ahead of the actual position $P_0$ so that the node $N_7'$ is contained in the automatic deceleration zone $Z_3$ by the zone setting of FIG. 5 (of the first embodiment) to execute the automatic deceleration, although such action is unnecessary. This may bother the driver. In the second embodiment, however, the node $N_7'$ is present outside (i.e., the warning zone $Z_2$) of the automatic deceleration zone $Z_3$ so that the unnecessary automatic deceleration is prevented from being executed.

A third embodiment of the present invention will be described with reference to FIGS. 9 to 13.

In the aforementioned first embodiment, the radius $R_1$ (i.e., the radius $R_1$ of the arc $C_1'$ for determining the forward limit of the individual zones $Z_1$, $Z_2$ and $Z_3$ ahead of the tentative position $N_k$) of the arc $C_1'$ around the tentative position $N_k$ is set equal to the first turnable radius $R_1$ which is calculated by Formula (5) on the basis of the estimated passage speed $V_k$ at the tentative position $N_k$ and the reference transverse acceleration $\alpha_1$, and is constant irrespective of the road shape. In the third embodiment to be described below, there is provided S-curve deciding means M11 (refer to FIG. 1) for deciding whether or not an S-curve exists on the road ahead of the tentative position $N_k$. When an S-curve is present, the ranges of the individual zones $Z_1$, $Z_2$ and $Z_3$ are corrected by the passableness deciding means M8. Specifically, a decision length $L_k$, as corresponding to the radius $R_1$ of the arc $C_1'$, is varied with the road shape ahead of the tentative position $N_k$, i.e., whether or not the road has an S-shape. As a result, the regions of the individual zones $Z_1$, $Z_2$ and $Z_3$ are varied with the road shape ahead of the tentative position $N_k$.

Figure 9:
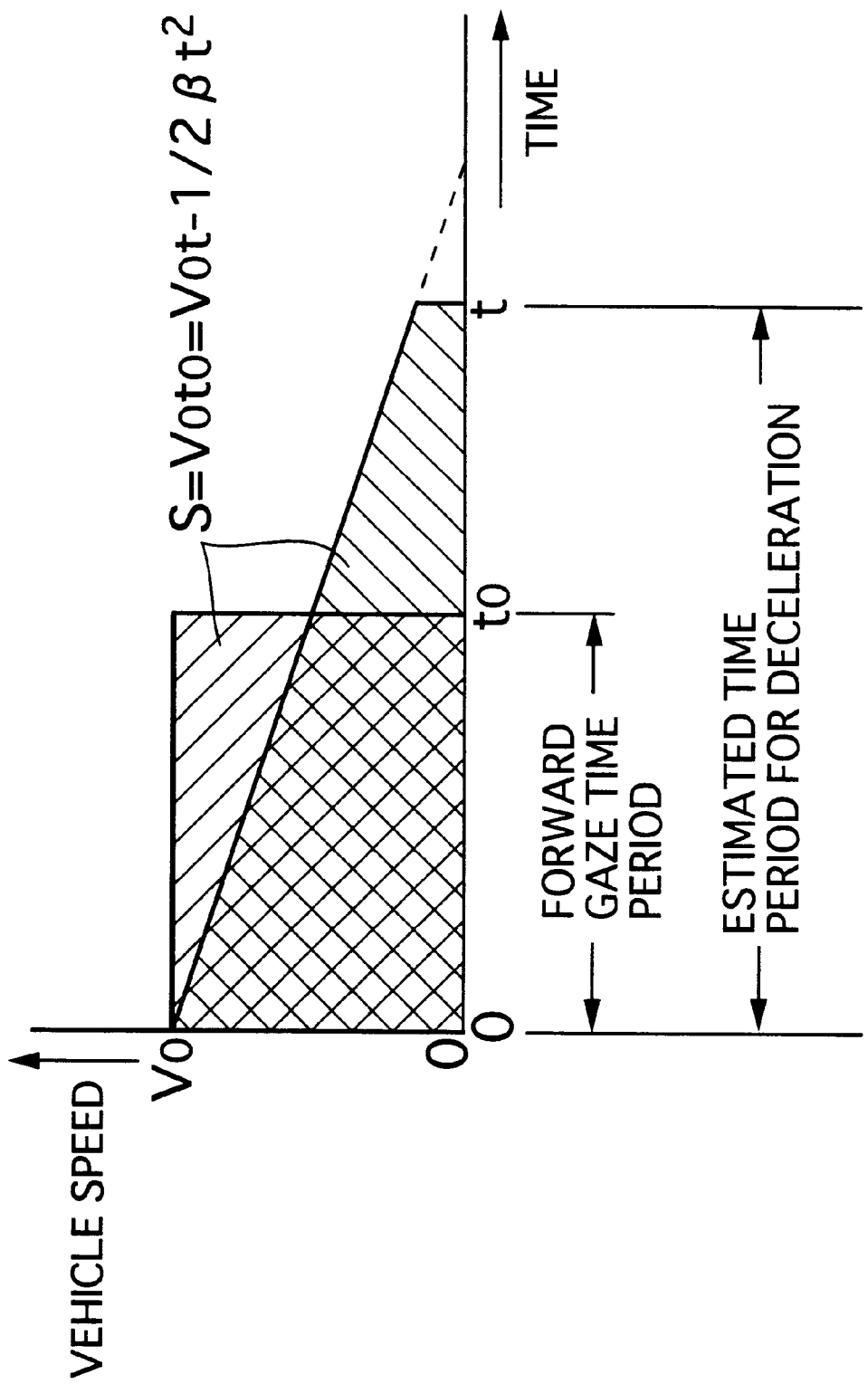
FIG. 9 is a diagram for explaining a method of calculating an estimated time period for a deceleration according to a third preferred embodiment of the invention.

The setting of the decision length $L_k$ will be described. In FIG. 9, a forward gaze length S (i.e., the area of a rectangular portion) is calculated by multiplying a vehicle speed $V_0$ at the actual position $P_0$ by a forward gaze time period $t_0$. The forward gaze length S corresponds to the distance for the driver to gaze the road ahead and increases with the increase in the vehicle speed $V_0$. Next, there is calculated an estimated time period t for deceleration, i.e., the time period necessary for the vehicle to travel the forward gaze length S while being decelerated at a deceleration $\beta$. This estimated time period t for the deceleration can be calculated as the height of a trapezoid having the same area S as that of the rectangle of FIG. 9 and is longer than the forward gaze time period $t_0$.

Figure 10:
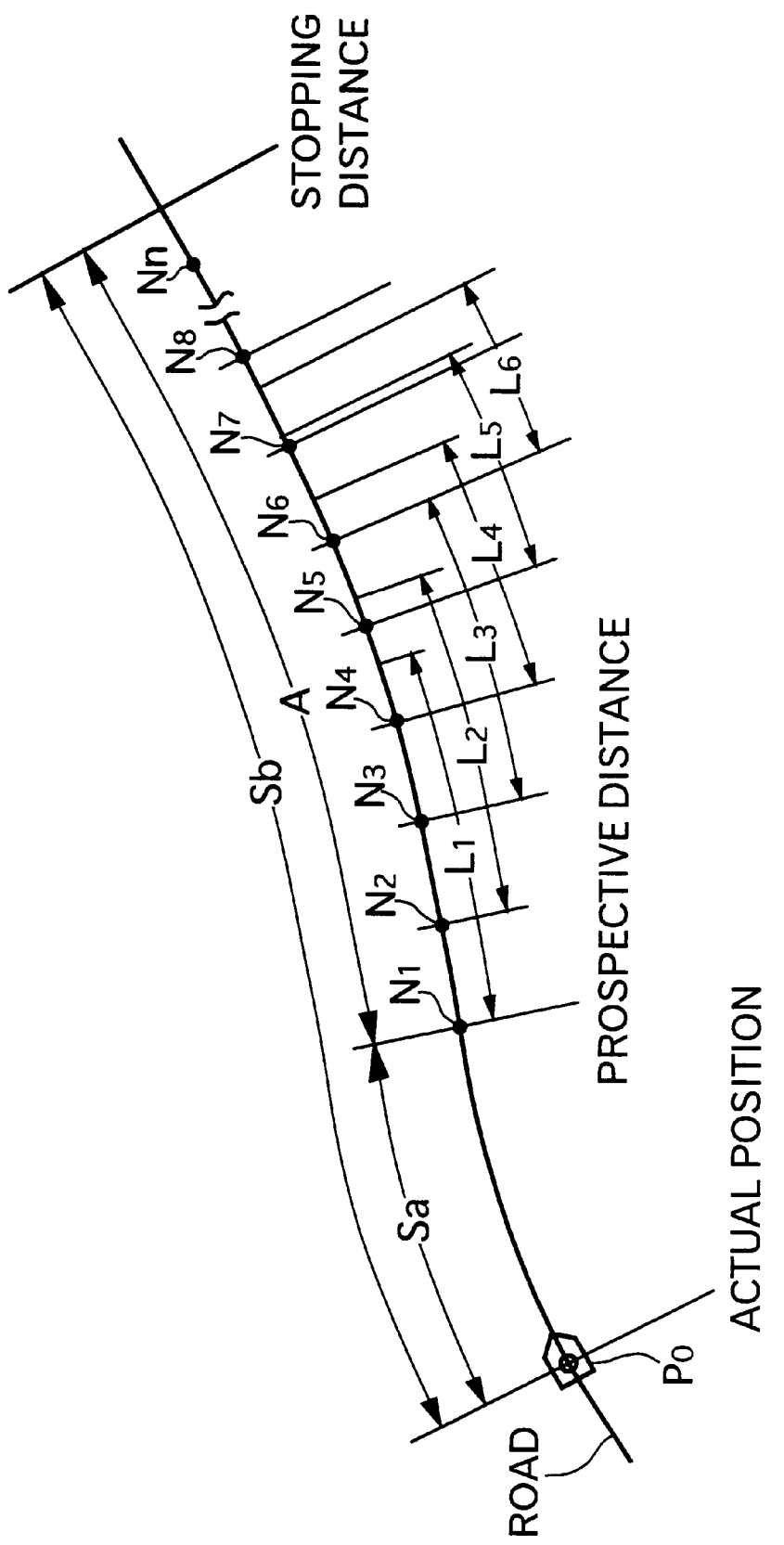
FIG. 10 is a diagram illustrating a set state of a decision length $L_k$ according to the third embodiment.

Subsequently, as to all the tentative positions $N_k$ in the processing section A, the decision length $L_k$ is calculated for each tentative position $N_k$ by multiplying the estimated passage speed $V_k$ at the tentative position $N_k$ by the estimated time period t for the deceleration. The estimated passage speed $V_k$ becomes smaller as the tentative positions $N_k$ become more remote so that the decision distance $L_k$ becomes correspondingly smaller for the more remote tentative position $N_k$ as shown in FIG. 10.

Figure 11:
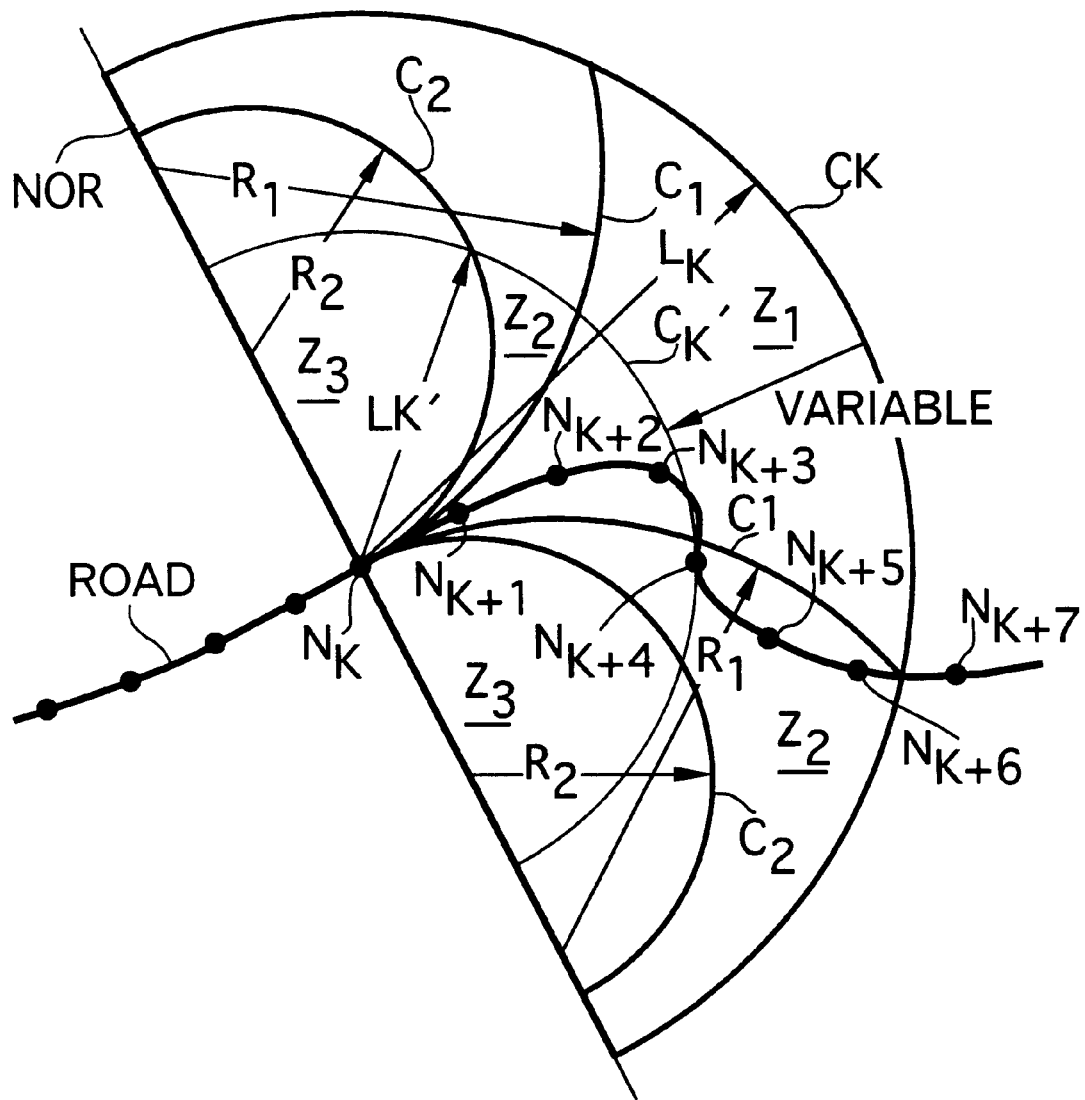
FIG. 11 is a diagram showing relations between individual zones at a tentative own position $N_k$ and the road according to the third embodiment.

FIG. 11 shows the regions of the individual zones $Z_1$, $Z_2$ and $Z_3$ at the tentative position $N_k$. The radius of an arc $C_k$ for determining the forward limits of those zones $Z_1$, $Z_2$ and $Z_3$ is the decision distance $L_k$. However, when the road inside of the decision length $L_k$ has an inflection point (that is, the road has an S-shape), the decision length $L_k$ is changed in the decreasing direction up to a decision length $L_k'$ corresponding the position of the next node of the inflection point. In the embodiment of FIG. 11, the section between the nodes $N_k$ to $N_{k+4}$ is curved rightwards but turned to a leftward direction when it shifts from the node $N_{k+3}$ to the node $N_{k+4}$. As a result, the decision length $L_k$ is changed into the decision length $L_k'$ passing through the node $N_{k+4}$.

Figure 12:
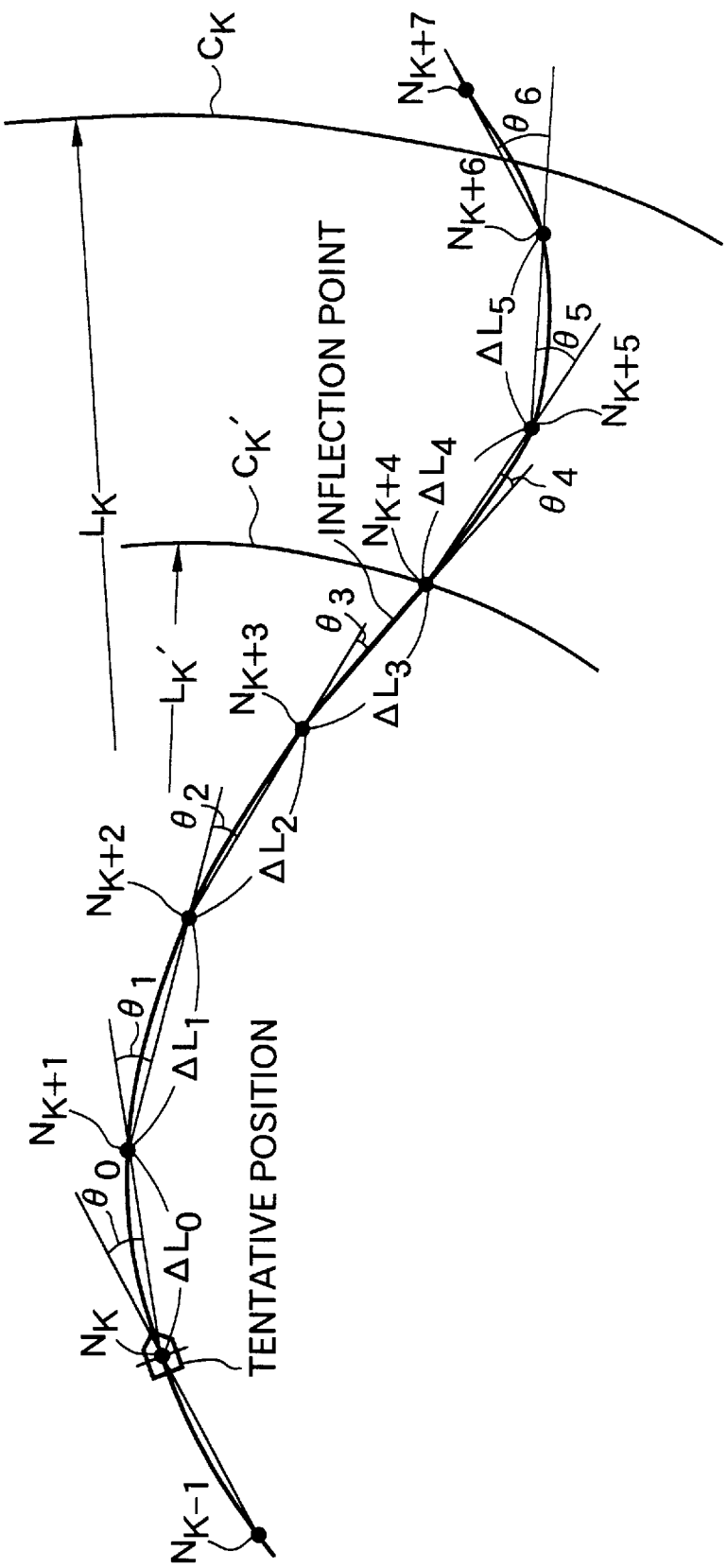
FIG. 12 is a diagram for explaining a method of determining an inflection point of the road according to the third embodiment.

This will be described in more detail with reference to FIGS. 12 and 13. Let us consider the case in which seven nodes $N_k$ to $N_{k+6}$ are present, for example, in the arc $C_k$ having a radius equal to the decision length $L_k$ around the tentative position $N_k$, as illustrated in FIG. 12. A length $\Delta L_0$ between the node $N_k$ and the next node $N_{k+1}$ is calculated to calculate an angle of intersection $\theta_0$ made between a straight line joining the node $N_{k-1}$ and the node $N_k$ and a straight line joining the node $N_k$ and the node $N_{k+1}$. Moreover, a length $\Delta L_1$ between the node $N_{k+1}$ and the node $N_{k+2}$ is calculated to calculate an angle of intersection $\theta_1$ made between a straight line joining the node $N_k$ and the node $N_{k+1}$ and a straight line joining the node $N_{k+1}$ and the node $N_{k+2}$. Likewise, the lengths $\Delta L_2$ to $\Delta L_6$ and the intersection angles $\theta_2$ to $\theta_6$ are calculated. These intersection angles $\theta_0$ to $\theta_6$ take positive values for a rightward curve and negative values for a leftward curve.

Next, the values $\theta_0/\Delta L_0$, $\theta_1/\Delta L_1$, - - - , and $\theta_6/\Delta L_6$ are calculated and are plotted on a vertical axis with a length on the horizontal axis in orthogonal coordinates to provide a graph, as illustrated in FIG. 13. As apparent from this graph, the polygonal line intersects the horizontal axis between the node $N_{k+3}$ and the node $N_{k+4}$, and this horizontal axis segment corresponds to the inflection point of the road. As illustrated in FIG. 12, the passableness is judged by drawing an arc $C_k'$ having the radius $L_k'$ through the node $N_{k+4}$ next to the inflection point and by setting the individual zones $Z_1$, $Z_2$ and $Z_3$ inside of the arc $C_k'$ of the radius $L_k'$ in place of the arc $C_k$ of the radius $L_k$.

Thus, if an S-curve is present in the region to be judged for the passableness, an accurate passableness cannot be judged, and an unnecessary warning or automatic deceleration may be executed to bother the driver. This problem can be solved by the present embodiment in which the passableness is judged only at the region inside of the inflection point of the S-curve.

As has been described hereinbefore, when the zone setting means sets the passableness deciding zones, the passableness deciding zones are not only set on the basis of the arcs which contact the tentative position with the turnable radius as a radius, but also are restricted within the range of the predetermined distance from the tentative position. As a result, any curve in the road ahead, which can be passed because it is far ahead of the tentative position $N_k$ or is bent in an S-shape so that it allows a sufficient deceleration distance, can be prevented from being decided as not passable by the control system of an embodiment of the invention. Further, unnecessary calculations need not be executed relative to any such curve to lighten the loads upon the arithmetic units. Moreover, the driver is prevented from being bothered by the automatic deceleration or warning which would otherwise be given if any such curves were decided as nonpassable.

On the other hand, the predetermined length for setting the passableness deciding zones is set on the basis of the estimated passage speed so that the passableness deciding zones can be properly set.

Further, because the S-curve deciding means decides whether or not the S-curve exists on the road within the predetermined length from the tentative own position, if an S-curve is present, the distance from the tentative position to the inflection point of the S-curve is set as the aforementioned predetermined length to prevent the passable S-curve from being decided as not passable.

Still further, the passableness deciding zones include the passable zone, the warning zone and the automatic deceleration zone and the control means performs the warning operation, when the road data of the road ahead of the tentative position belongs to the warning zone, and performs the automatic deceleration operation when the road data ahead of the tentative position belong to the automatic deceleration zone. As a result, the vehicle can be finely controlled according to the state of the curve of the road ahead.

Further yet, there are individually set a plurality of turnable radii and a plurality of predetermined lengths to set the passableness deciding zones. As a result, the passableness deciding zones can be properly set with greater accuracy.

Although the present invention has been specifically described in connection with the presently preferred embodiments, it will be understood by persons skilled in the art that variations and modifications may be made thereto without departing from the spirit or essence of the invention.

In the third embodiment, for example, the decision lengths $L_k$ and $L_k'$ are measured as the radii of the arcs $C_k$ and $C_k'$ around the tentative position $N_k$, but may be measured as curves along the road.

The scope of the invention is indicated by the appended claims rather than by the foregoing description of presently preferred embodiments.

We claim:

1. A vehicle control system comprising:
   map data outputting means for outputting map data including road data of a road to be followed by a vehicle;
   position detecting means for detecting an actual position of the vehicle on a map;
   vehicle speed detecting means for detecting a vehicle speed;
   tentative position setting means for setting a tentative position on the road ahead of the actual position;
   estimated passage speed calculating means for calculating an estimated passage speed at the tentative position based on a distance between the actual position and the tentative position;
   turnable radius calculating means for calculating turnable radii at the tentative position based on the estimated passage speed;
   zone setting means for setting a plurality of passableness deciding zones with arcs in contact with the tentative position on the turnable radii within a range of a predetermined distance ahead of the tentative position;
   passableness deciding means for deciding the passableness of the vehicle by overlapping the road data ahead of the tentative position and the passableness deciding zones; and
   control means for controlling the vehicle when it is decided that the vehicle cannot safely pass a road within said predetermined distance.

2. A vehicle control system as set forth in claim 1, wherein said predetermined distance for setting the passableness deciding zones is set based on the estimated passage speed.

3. A vehicle control system as set forth in claim 1, wherein the passableness deciding zones include a passable zone, a warning zone and an automatic deceleration zone, and wherein said control means performs a warning when the road data of the road ahead of the tentative position are included in the warning zone, and performs an automatic deceleration when the road data of the road ahead of the tentative position are included in the automatic deceleration zone.

4. A vehicle control system as set forth in claim 1, wherein said turnable radii and said predetermined distance are individually set in plurality so that the passableness deciding zones are set based on those said turnable radii and those said predetermined distances.

5. A vehicle control system as set forth in claim 1, wherein said turnable radius calculating means calculates said turnable radii at the tentative position further based on at least one of a friction coefficient of a road surface, a state of the driver, a slope of the road and a prevailing light condition.

6. A vehicle control system as set forth in claim 1, wherein said estimated passage speed calculating means calculates the estimated passage speed further based on a reference deceleration corresponding to a normal deceleration to be effected by the driver.

7. A vehicle control system as set forth in claim 1, wherein said zone setting means sets said passableness deciding zones further with at least one arc extending about the tentative position within the range of said predetermined distance with at least one of said turnable radii and said tentative position as a focus thereof.

8. A vehicle control system as set forth in claim 1, wherein said turnable radius calculating means calculates said turnable radii further based on at least one reference lateral acceleration derived from prevailing environmental conditions.

9. A vehicle control system as set forth in claim 1, wherein one passableness deciding zone set by said zone setting means is an automatic deceleration zone within a smaller range of a smaller predetermined distance in comparison to other passableness deciding zones set by said zone setting means.

10. A vehicle control system as set forth in claim 1, further comprising S-curve deciding means for deciding whether or not an S-curve exists on said road within said predetermined distance from said tentative position; and
   said zone setting means reduces a length of said predetermined distance when said S-curve deciding means decides that an S-curve exists on the road within the range of said predetermined distance.

11. A vehicle control system as set forth in claim 1, wherein all said passableness deciding zones set by said zone setting means are within said range of the predetermined distance ahead of the tentative position.

12. A vehicle control system as set forth in claim 1, wherein said turnable radius calculating means calculates different turnable radii at the tentative position based on the estimated passage speed; and said zone setting means sets a plurality of different passableness deciding zones with said arcs in contact with the tentative position on the turnable radii within said range of the predetermined distance ahead of the tentative position.

13. A vehicle control system comprising;

map data outputting means for outputting map data including road data of a road to be followed by a vehicle;

position detecting means for detecting an actual position of the vehicle on a map;

vehicle speed detecting means for detecting a vehicle speed;

tentative position setting means for setting a tentative position on the road ahead of the actual position;

estimated passage speed calculating means for calculating an estimated passage speed at the tentative position based on a distance between the actual position and the tentative position;

turnable radius calculating means for calculating turnable radii at the tentative position based on the estimated passage speed;

zone setting means for setting a plurality of passableness deciding zones with arcs in contact with the tentative position on the turnable radii within a range of a predetermined distance ahead of the tentative position;

passableness deciding means for deciding the passableness of the vehicle by overlapping the road data ahead of the tentative position and the passableness deciding zones;

S-curve deciding means for deciding whether or not an S-curve exists on said road within said predetermined distance from the tentative position, wherein a distance from the tentative position to an inflection point of the S-curve, if any, is set as said predetermined distance; and control means for controlling the vehicle when it is decided that the vehicle cannot safely pass a road within said predetermined distance.

* * * * *

UNITED STATES PATENT AND TRADEMARK OFFICE
CERTIFICATE OF CORRECTION

PATENT NO : 6,067,497
DATED     : 23 May 2000
INVENTOR(S): Hiroshi Sekine, Shohei Matsuda It is certified that error appears in the above-identified patent and that said Letters Patent are hereby corrected as shown below:

On the cover page, under "[56] References Cited", further under "FOREIGN PATENT DOCUMENTS", change the date for document number 6281471 from "7/1994" to --10/1994--;

in the "[57] ABSTRACT", 19th line, change "soon" to --so on--.

Column 6, line 37, change "curves" to --curve--;
line 52, delete the comma.

Column 8, line 25, after "corresponding" insert --to--.

Column 9, line 23, delete "own".

Signed and Sealed this

Third Day of April, 2001

Attest:

NICHOLAS P. GODICI

Attesting Officer   Acting Director of the United States Patent and Trademark Office